United States Patent [19]

McKinney et al.

[11] Patent Number: 5,339,625

[45] Date of Patent: Aug. 23, 1994

[54] HYBRID ROCKET MOTOR SOLID FUEL GRAIN

[75] Inventors: Bevin C. McKinney, Oxnard; Roy J. Kniffen, Jr., Ventura, both of Calif.

[73] Assignee: American Rocket Company, Takoma Park, Md.

[21] Appl. No.: 986,087

[22] Filed: Dec. 4, 1992

[51] Int. Cl.$^5$ .................................................. F02K 9/00
[52] U.S. Cl. ......................................... 60/219; 60/251; 60/255
[58] Field of Search ................ 60/253, 255, 219; 102/285, 289, 291

[56] References Cited

U.S. PATENT DOCUMENTS

| | | |
|---|---|---|
| 2,753,801 | 7/1956 | Cumming . |
| 2,791,883 | 5/1957 | Moore et al. . |
| 2,984,973 | 5/1961 | Stegelman . |
| 2,995,091 | 8/1961 | Haymes et al. ............... 102/285 |
| 3,068,641 | 12/1962 | Fox . |
| 3,083,527 | 4/1963 | Fox . |
| 3,090,196 | 5/1963 | Brewer ............................ 60/255 |
| 3,115,007 | 12/1963 | Fox . |
| 3,116,599 | 1/1964 | Campbell . |
| 3,132,475 | 5/1964 | Hopper . |
| 3,132,476 | 5/1964 | Conrad . |
| 3,137,128 | 6/1964 | Francais et al. . |
| 3,142,152 | 7/1964 | Sessmus, Jr. . |
| 3,144,751 | 8/1964 | Blackman, Jr. et al. . |
| 3,156,092 | 11/1964 | Holzman . |
| 3,164,093 | 1/1965 | Holzman et al. . |
| 3,178,885 | 4/1965 | Loughran . |
| 3,214,906 | 11/1965 | Coleal . |
| 3,234,729 | 2/1966 | Altman et al. . |
| 3,274,771 | 9/1966 | Lieberman et al. . |
| 3,302,403 | 2/1967 | Krzycki et al. . |
| 3,323,308 | 6/1967 | Grace . |
| 3,664,133 | 5/1972 | Iwanciow et al. ............. 102/289 |
| 3,782,112 | 1/1974 | Muzzy . |
| 3,789,610 | 2/1974 | Stone . |
| 3,807,171 | 4/1974 | Anderson ....................... 60/255 |
| 3,924,405 | 12/1975 | Cohen et al. ................... 60/219 |
| 4,424,679 | 1/1984 | Holzman . |
| 4,428,785 | 1/1984 | Suzuki et al. ................. 149/19.9 |
| 4,527,389 | 7/1985 | Biddle et al. . |
| 4,604,248 | 8/1986 | Dehm ............................ 102/291 |
| 4,923,544 | 5/1990 | Weisse . |
| 4,964,340 | 10/1990 | Daniels et al. . |
| 4,967,533 | 11/1990 | Weisse ............................ 52/603 |
| 5,005,800 | 4/1991 | Weisse . |
| 5,040,966 | 8/1991 | Weisse . |
| 5,119,627 | 6/1992 | Bradford et al. ............... 60/251 |

Primary Examiner—Richard A. Bertsch
Assistant Examiner—Timothy S. Thorpe
Attorney, Agent, or Firm—Nixon & Vanderhye

[57] ABSTRACT

A hybrid rocket motor includes a solid propellant fuel grain component which incorporates fuel strengthening agents or mechanical retention devices. In one embodiment, the hybrid fuel formulation is a modified elastomeric polyurethane reaction product based on a liquid hydroxyl-terminated homopolymer of butadiene. A reinforcing agent is added which increases the tensile and tear strength of the grain by 50%. By so strengthening the grain, separation of the grain during the last portion of the burn is minimized. In a second exemplary embodiment, mechanical web stiffeners are provided in the form of a core configuration about which the fuel grain is cast. The web stiffeners are in the form of an open tetrahexagonal truss structure which mechanically traps and adheres to the fuel and becomes an integral part of the fuel grain geometry. In both embodiments, the integrity of the webs is maintained throughout the burn. Foam slivers may be added to the radially inner ends of web stiffeners to further inhibit undesired separation during the last part of the burn.

20 Claims, 3 Drawing Sheets

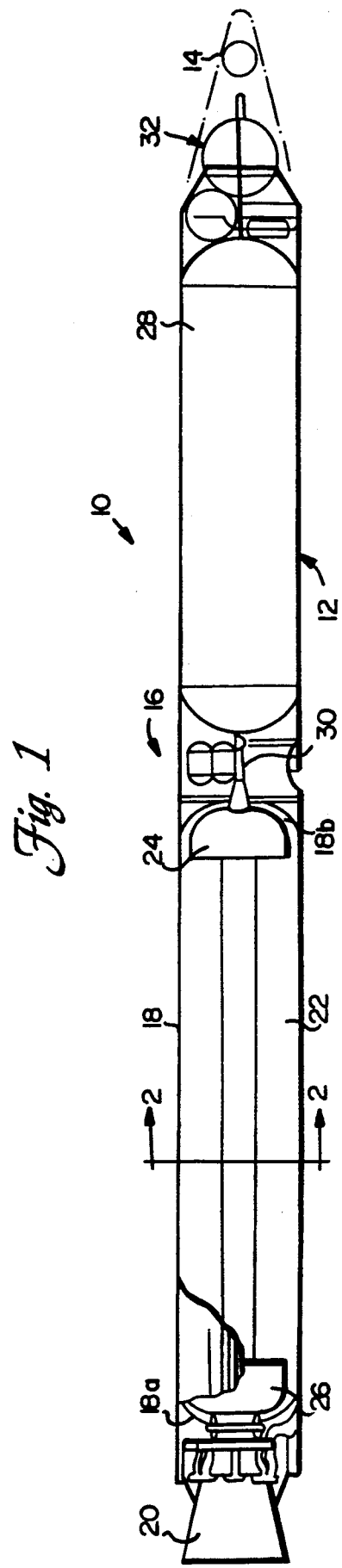
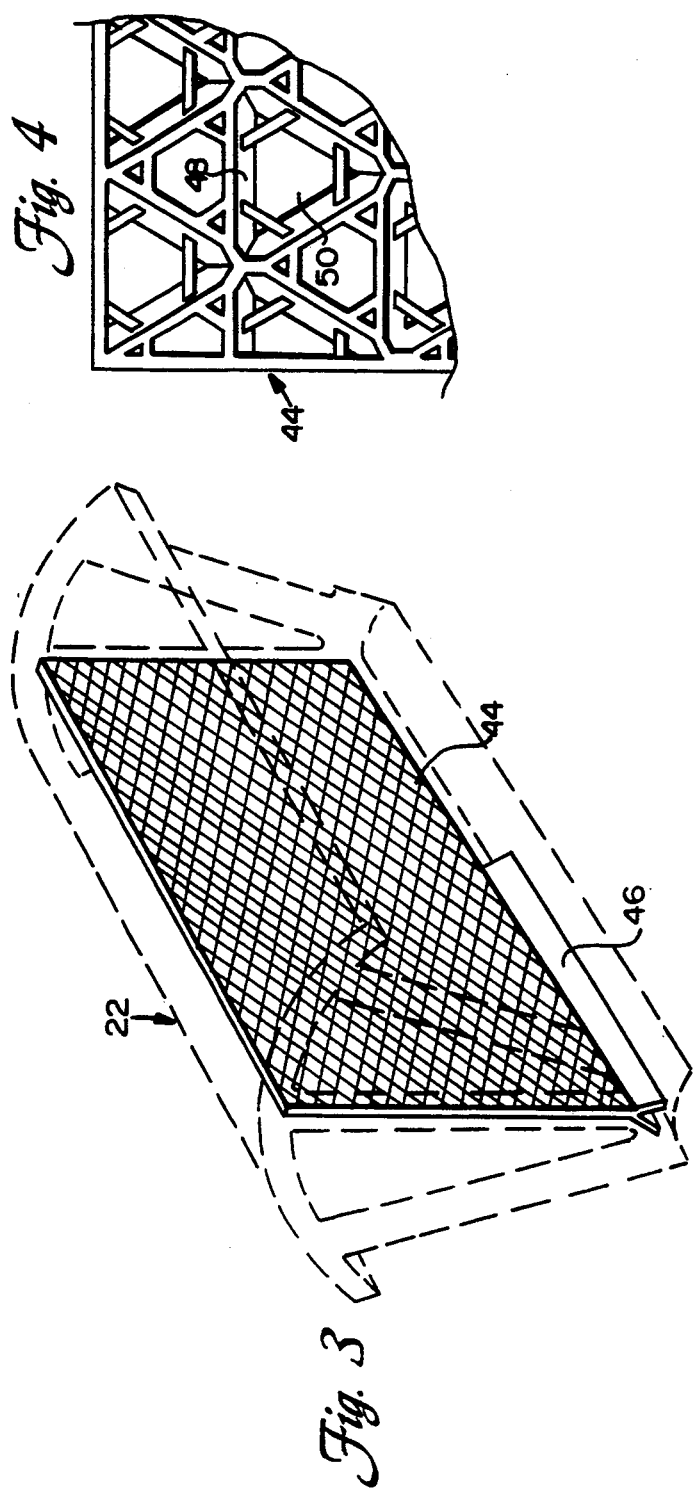

HYBRID ROCKET MOTOR SOLID FUEL GRAIN

FIELD OF THE INVENTION

The present invention generally relates to the art of rocket propulsion systems, and more specifically to an improved configuration for a solid fuel grain component of a hybrid rocket motor.

BACKGROUND

A hybrid rocket engine or motor is a cross between a solid propellant rocket motor and a liquid propellant rocket motor. In its more common configuration, a hybrid utilizes a fluid oxidizer to burn a solid fuel element. The hybrid rocket propellant can be ignited by an igniter such as an electrically generated spark, or by initial injection of an ignition fluid which exothermically reacts with the liquid oxidizer. A "reverse" hybrid, on the other hand, applies a combustible liquid fuel to a solid oxidizer. This application relates to the solid fuel/fluid oxidizer form of hybrid which, generally, is well known. Many examples of various hybrid rocket configurations appear, for example, in the patent literature. Representative are U.S. Pat. Nos. 4,424,679; 3,789,610 3,782,112; 3,323,308; 3,302,403; 3,274,771; 3,214,906; 3,164,093; 3,178,885; 3,144,751; 3,142,152; 3,137,128; 3,132,475; 3,116,599; 3,115,007; 3,083,527; 3,068,641; 2,984,973; 2,791,883; and 2,753,801.

A more recent example of a hybrid rocket motor is disclosed in commonly owned U.S. Pat. No. 5,119,627, issued Jun. 9, 1992.

Some of the more well known advantages of a hybrid rocket motor over a purely solid or purely liquid fuel rocket motor are: (1) the complete separation of fuel from the principal oxidizer, thus eliminating the potential for uncontrolled mixing; (2) the capability of optimizing the combination of propellant ingredients regardless of whether these are solid or liquid, and (3) the capability of easily stopping and restarting the motor. In addition to its on-off capability, the engine is easily throttleable since there is only one liquid component. In addition, since the solid fuel component need not contain any oxidizer, it is easily mass produced under less hazardous conditions and at less cost.

A conventional hybrid rocket motor includes a hollow housing or combustion chamber in which an elongated solid fuel component, or "grain", is secured. The solid fuel grain may have a "wagon wheel" cross sectional shape as disclosed in the above-identified U.S. Pat. No. 5,119,627, with a central hollow hub, an outer rim, and a plurality of spokes joining the hub to the rim. The wedge-shaped spaces between the spokes, known as combustion "ports", extend the axial length of the grain, thereby allowing combustion gas to flow through the grain.

The liquid or gaseous oxidizer is provided in a tank or container mounted forward of the fuel grain, and is caused to flow through the fuel grain passages. Ignition causes combustion of the fuel-oxidizer mixture at the exposed surfaces of the fuel grain, resulting in the generation of thrust as the high pressure combustion products are discharged through the rocket nozzle.

A significant problem inherent in conventional hybrid rocket motor design is that it is difficult to burn all of the solid fuel grain in a controlled manner. When it is attempted to burn the entire fuel grain, a point is reached where a central unburned portion separates from the main body from the grain, and is moved by the combustion gas flow into the nozzle area, causing a major reduction in thrust, and potentially significant damage to the nozzle and/or rocket. This may be avoided by burning the fuel grain only down to a point at which the undesirable separation will not occur. This is not a completely satisfactory solution, however, since the remaining portion of the fuel grain, and hence also precious space and weight in the rocket motor, is wasted.

While the wagon wheel grain configuration can provide an optimal ratio of exposed surface area to cross sectional area, the disadvantage of the wagon wheel design is that because of the slow burning rate of the fuel, the webs become very thin during the last portion of the burn and again, subject to separation. It has been attempted to reinforce the wagon wheel fuel grain by incorporating solid stiffening sheets in the spoke or web portions of the grain. This too has not proven satisfactory since the fuel grain tends to separate from the solid sheets during burning.

SUMMARY OF THE INVENTION

The present invention retains the overall benefits of the wagon wheel fuel grain design but at the same time overcomes the above described disadvantages by maintaining the integrity of the fuel grain particularly during the last portion of the burn through the incorporation of fuel strengthening agents and/or mechanical retention devices.

Generally, the hybrid fuel formulation is a modified elastomeric polyurethane reaction product based on a liquid hydroxyl-terminated homopolymer of butadiene. Among other additives (such as extenders and combustion enhancers), this invention in one exemplary embodiment relates to the addition of a reinforcing agent which improves the physical properties of the polybutadiene elastomer fuel grain. For example, the addition of a short chain diol, such as Voranol TM increases the tensile and tear strength of the grain by 50%. By so strengthening the grain, separation of the grain during the last portion of the burn is minimized.

In a second exemplary embodiment, mechanical web or sheet stiffeners are provided in the form of a core configuration about which the fuel grain is cast. In an exemplary embodiment, the stiffeners are in the form of a tetrahexagonal or honeycomb-like truss structure in sheet form. As will be appreciated by those of ordinary skill in the art, the fuel is cast directly into the motor casing but, in order to achieve the wagon wheel shape, a series of port molds and associated center mold must be inserted in the casing prior to casting. At the same time, the stiffeners are centered within the fuel receiving cavities between the port molds. During casting, the stiffener structure mechanically traps and adheres to the fuel, and thus becomes an integral part of the fuel grain geometry. Following casting, the mold parts are removed from the motor casing, leaving the reinforced wagon wheel fuel grain in place within the casing. By incorporating such stiffeners into the fuel grain, the integrity of the fuel grain is maintained throughout the burn, during which the stiffeners themselves are partially consumed.

It is another feature of the invention to provide sacrificial foam pieces at the center hub of the wagon wheel, and preferably only at the aft end of the grain. These foam pieces are bonded to the radially inner ends of the web stiffeners prior to casting the fuel into the casing.

Because the foam regresses faster than the fuel, it replaces the sections of fuel that are known to have ejected from the motor casing in the past.

Accordingly, in accordance with a first aspect of the invention, there is provided a solid fuel grain component for a hybrid rocket motor comprising:

a) a hollow central hub and an outer ring interconnected by a plurality of substantially radially extending spokes, each spoke having an internal reinforcing web and associated foam element attached at one end thereof, the web extending axially along substantially the entire axial length of the grain.

In another aspect, the invention relates to a solid fuel grain component for a hybrid rocket motor comprising:

a) a hollow central hub and an outer ring interconnected by a plurality of substantially radially extending spokes, each spoke having an internal reinforcing web comprising a sheet formed with a plurality of openings.

In still another aspect, the invention relates to a hybrid rocket comprising a casing, a hybrid fuel rocket motor located within the casing, and a nozzle fixed at a rearward end of the casing; the motor including a solid fuel grain component having a substantially wagon wheel cross-sectional shape including a hub and a plurality of radial spoke sections, the fuel grain including:

a) first means in at least said radial spoke sections for strengthening the grain; and b) second means located at said hub for preventing break up of the grain.

Additional objects and advantages of the invention will become apparent from the detailed description which follows.

BRIEF DESCRIPTION OF THE DRAWINGS

FIG. 1 is a side view of a hybrid rocket, partially broken to reveal the interior components thereof;

FIG. 3 is a perspective view of a portion, shown partially in phantom, of the fuel grain illustrated in FIGS. 1 and 2 and illustrating in general form the incorporation of a web stiffener;

FIG. 4 is a partial detail of the web stiffener shown generally in FIG. 3;

DETAILED DESCRIPTION OF THE DRAWINGS

Figure 2:
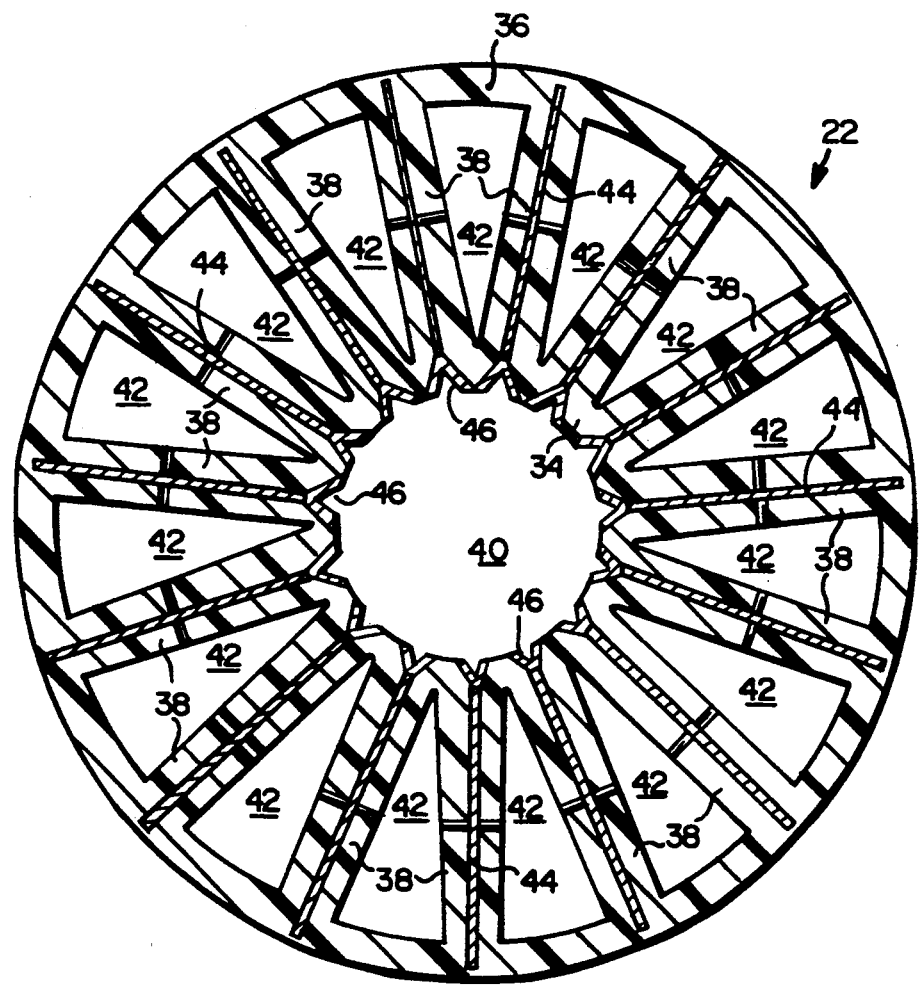
FIG. 2 is a section taken along the line 2—2 of FIG. 1.

Referring now to FIG. 1, a hybrid propellant rocket 10 includes generally an outer casing or shell 12 mounting a payload 14 carried in the forward nose portion of the rocket. Propulsion for the rocket 10 is provided by a hybrid rocket motor propulsion system indicated generally by numeral 16.

The aft section 18 of the rocket casing 12 also comprises the motor casing which constitutes the combustion chamber for the rocket. The motor casing 18 is generally cylindrical in shape and has a rearward end bell 18a and a forward end bell 18b which are bolted and bonded or otherwise suitably attached within opposite ends of the casing. Both end bells 18a, 18b are lined with fuel, thereby enhancing the efficiency of the motor 16. The aft end bell 18a is for mixing the unburned combustion gases and the forward end bell 18b is an oxidizer mixing chamber. Nozzle 20 is fitted to the rear end bell 18a for rearward discharge of combustion gases from the casing 18 to generate thrust.

A generally cylindrical solid fuel grain component 22 is supported within the casing 18. Front and rear combustion chambers 24 and 26 are provided forwardly and rearwardly of the grain 22 as defined by the forward end bell 18b and rearward end bell 18a.

The hybrid motor is supplied with liquid or gaseous oxidizer from a tank 28 located forwardly of the motor casing 18. The fluid propellant component, for example, liquid oxygen (LOx), is injected into the motor casing or housing 18 by means of an injector 30. In addition, a non-flammable pressurizing gas such as helium is used to pressurize the LOx within the tank 28. This is accomplished with a pressurization system 32 located between the liquid propellant tank 28 and the payload 14.

Turning to FIG. 2, the fuel grain 22 is illustrated in cross-section to show more clearly the improvements of this invention. The fuel grain 22 has a wagon wheel cross sectional shape which includes a central hub 34, a radially outer rim 36 and a plurality of radially extending spokes 38 connecting the hub 34 to the rim 36. This arrangement provides a hollow center port 40 and a plurality of wedge-shaped port passages 42.

The hybrid fuel grain 22 is essentially a modified elastomeric polyurethane reaction product based on a liquid, hydroxyl-terminated homopolymer of butadiene. Carbon powder is added to the mix to block infrared radiation through the fuel during combustion. The nominal formulation for this fuel is as follows:

| | |
|---|---|
| R-45HT (polyurethane resin) Atochem Inc. | 100. parts by weight |
| Isonate 2143L (isocyanate curing agent) The Dow Chemical Co. | 12.5 parts by weight |
| Darco GFB (carbon powder) American Norit Co. Inc. | 2.0 parts by weight |

In a first exemplary embodiment of the invention, a reinforcing agent is added which improves the physical properties of the polybutadiene elastomer. More specifically, an auxiliary polyol, e.g., a short chain diol such as Voranol TM is added to the fuel mixture which improves the tensile and tear strength of the fuel grain by 50%. While it is acknowledged that a short chain diol such as Voranol TM is known to increase the strength of rubber compounds including polybutadiene, it has not to applicants' knowledge been utilized previously to increase the strength of polybutadiene in the context of a hybrid rocket motor. In a preferred embodiment of this application, a short chain diol such as Voranol TM is added to the fuel grain so as to comprise approximately 3.0% of the total fuel by weight. It will be understood that other chemical compositions may be suitable for use as reinforcing agents. In addition, other additives may be included in the fuel mixture such as, for example, extenders and combustion enhancers.

In another exemplary embodiment, the fuel grain 22 is reinforced by a series of open-lattice type reinforcers or stiffeners 44, with one such stiffener located centrally of each radial spoke 38 of the wagon wheel fuel grain 22. Each stiffener structure extends along substantially the entire axial length of the grain 22, and radially from approximately the center port or hub 40 of the grain to the radially outer periphery or rim 36. At the radially innermost portion of each stiffener 44, facing the center port 40, there is secured an inverted V-shaped "sliver" 46 extending axially along a portion of the length of each stiffener, for a purpose described below. As best seen in FIG. 3, the slivers 46 extend only along the aft section of the fuel grain, preferably along about the aft ⅓ of the grain.

Figure 5:
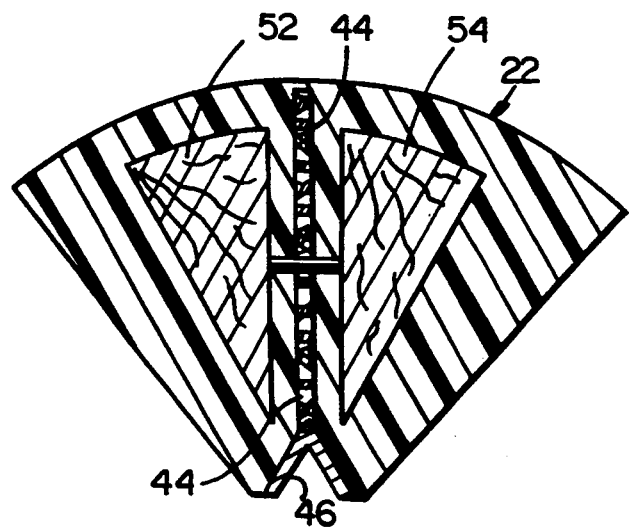
FIG. 5 is a partial cross section of the fuel grain with casting port molds in place.
Figure 6:
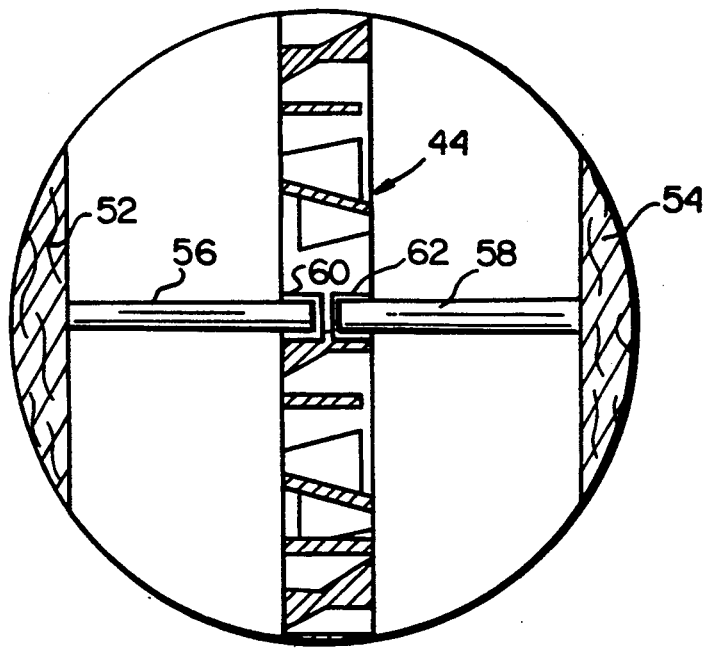
FIG. 6 is an enlarged detail taken from FIG. 5.

In a preferred arrangement, the stiffeners 44 are constructed of an injection molded tetrahexagonal truss structure available from Tetrahex, Inc. of Camarillo, Calif. under the name "Tetraweb". This material, also disclosed in U.S. Pat. No. 4,967,533 (the entirety of which is incorporated herein by reference) is shown in some detail in FIG. 4 and includes an arrangement where the apices of the individual tetrahedrons 48 of the structure are truncated and made hollow as shown at 50. The specific configuration of the structure is explained in greater detail in the '533 patent. The tetrahexagonal structure of the stiffeners 44 becomes an integral part of the fuel grain geometry in the sense that, during manufacture of the fuel grain, a stiffener 44 and foam sliver 46 are centered within each cavity (to receive fuel in the casting process which will form a spoke 38) between adjacent port molds 52, 54, as best seen in FIGS. 5 and 6. It will be appreciated that sufficient port molds are inserted in the casing 18 and arranged in an annular array so as to produce the desired wagon wheel design.

Again with reference to FIGS. 5 and 6, after the port mold components 52, 54 and a center or core mold (not shown) are in place, the stiffeners 44 are inserted into the cavities and each is centered within its respective cavity by a pair of pins 56, 58. These pins are received in sockets 60, 62, respectively, (molded into the stiffener 44) and extend laterally away from either side of the stiffener 44 to engage the port molds 52, 54. Following casting, the port mold elements and the core mold are removed, leaving the wagon-wheel shaped fuel grain in place within the casing, with the fuel material interlocked within the tetrahexagonal openings in the web stiffeners 44, as best seen in FIG. 5. It will be further appreciated that other stiffener structures may be employed so long as the stiffener structure causes the fuel to interlock with the stiffener during casting of the fuel.

Following removal of the mold elements, the center port 40 may be plugged (with material cast into the port) in some instances so that all of the LOx flows through the port passages 42. For other applications, the center port 40 may be left open.

During combustion, as the spokes 38 regress, the stiffeners 44 are partially consumed, but maintain fuel grain integrity during the last portion of the burn.

It should be noted that the centering pins 56, 58 are fabricated out of a material having a similar burning rate to the solid fuel grain 22 and are consumed along with the fuel during motor operation.

The foam slivers 46 are composed of urethane foam or any plastic foam with good fuel characteristics. The burning rate of the foam is tailored by varying the density of the foam. The foam slivers 46 serve several functions including:

1. As the fuel grain spokes become thinner near fuel exhaustion, the strategically placed foam slivers can locally reinforce and stiffen the fuel grain to prevent distortion and tearing;
2. The foam slivers 46 provide a low density filler material to replace fuel in areas of the motor where full fuel utilization may be difficult to achieve, thus reducing the residual weight of the motor at burnout; and
3. Since the foam sliver reinforcers burn away more rapidly than the surrounding fuel, they can be strategically located to provide a differentially higher burn rate in selected areas. This allows more flexibility in tailoring the fuel grain burn-out geometry.

While the above described embodiments involve the use of chemical or mechanical strengthening mechanisms, it will be appreciated that both may be employed if desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A solid fuel grain component for a hybrid rocket comprising:
   a) a central hub defining a center port, and an outer ring interconnected by a plurality of substantially radially extending spokes defining a plurality of wedge-shaped liquid fuel port passages, each spoke having an internal reinforcing web and an associated foam elements attached at a radially inner edge thereof, said web extending axially along at least a part of the axial length of the grain.

2. The solid fuel grain component of claim 1 wherein each foam element extends along only an aft section of the reinforcing web.

3. The solid fuel grain component of claim 1 wherein said fuel grain is made substantially of polybutadiene.

4. The solid fuel grain component of claim 2 wherein said foam element has a substantially inverted V-shape.

5. The solid fuel grain component of claim 1 wherein said center part central hub is plugged.

6. The solid fuel grain component of claim 1 wherein each said reinforcing web comprises a sheet formed with a plurality of tetrahexagon shaped openings such that propellant component grain material is interlocked within said openings.

7. A solid fuel grain component for a hybrid rocket motor comprising:
   a) a central hub defining a center port and an outer ring interconnected by a plurality of substantially radially extending spokes defining a plurality of wedge-shaped liquid fuel port passages, each spoke having an internal reinforcing web comprising a sheet formed with a plurality of shaped openings.

8. The solid fuel grain component of claim 7 wherein said fuel grain is made substantially of polybutadiene.

9. The solid fuel grain component of claim 7 wherein said center part central hub is plugged.

10. A hybrid rocket comprising a casing, a hybrid fuel rocket motor located within said casing, and a nozzle fixed at a rearward end of the casing; said motor including a solid fuel grain component having a substantially wagon wheel cross-sectional shape including a hub defining a center port and a plurality of radial spoke sections defining a plurality of wedge-shaped liquid fuel port passages, said fuel grain including:
   a) first means in at least said radial spoke sections for strengthening the grain; and
   b) second means located within said hub and bonded to said first means for preventing break up of the grain during fuel burn, said second means having burn characteristics different than said first means.

11. The rocket of claim 10 wherein said first means comprises a chemical additive.

12. The rocket of claim 10 wherein said first means comprises a sheet of material in each radial spoke section.

13. The rocket of claim 12 wherein said first means also comprises a chemical additive.

14. The rocket of claim 12 wherein each said sheet is formed with a plurality of tetrahexagon shaped openings enabling the fuel grain component material to be interlocked with said sheet.

15. The rocket of claim 12 wherein said second means comprises a foam sliver element fixed to a radially innermost end of each sheet.

16. The rocket of claim 12 wherein each sheet is provided with a pair of mold cavity centering pins.

17. The rocket of claim 11 wherein said chemical additive comprises an auxiliary polyol.

18. The rocket of claim 10 and further comprising front and rear end bell components secured to said casing in front of and behind said fuel grain to thereby define forward and aft combustion chambers, respectively.

19. The rocket of claim 18 wherein each of said end bells has fuel material bonded to an interior surface thereof.

20. The rocket of claim 10 wherein said fuel grain comprises polybutadiene and carbon powder, and wherein said first means comprises an auxiliary polyol comprising approximately 3.0% by weight of the fuel grain.

* * * * *